United States Patent
Yamashita et al.

[11] Patent Number: 6,130,777
[45] Date of Patent: Oct. 10, 2000

[54] LENTICULAR LENS SHEET WITH BOTH A BASE SHEET HAVING LENTICULAR ELEMENTS AND A SURFACE DIFFUSING PART HAVING ELEMENTS OF ELEMENTARY SHAPE SMALLER THAN LENTICULAR ELEMENTS

[75] Inventors: Yoshiyuki Yamashita; Hitomu Watanabe, both of Shinjuku-Ku, Japan

[73] Assignee: Dai Nippon Printing Co., Ltd., Japan

[21] Appl. No.: 08/856,597

[22] Filed: May 15, 1997

[30]   Foreign Application Priority Data

May 16, 1996  [JP]  Japan ................................. 8-144823
May 16, 1996  [JP]  Japan ................................. 8-144824
May 16, 1996  [JP]  Japan ................................. 8-144825

[51] Int. Cl.[7] ........................... G03B 21/60; G02B 27/10
[52] U.S. Cl. ........................................... 359/456; 359/619
[58] Field of Search ............................. 359/456, 455, 359/619, 620, 621, 622, 623, 624, 625, 626, 460

[56]   References Cited

U.S. PATENT DOCUMENTS

| | | | |
|---|---|---|---|
| 1,666,808 | 4/1928 | Büchner ................................. | 359/455 |
| 2,736,235 | 2/1956 | Toulon .................................... | 88/57 |
| 4,071,292 | 1/1978 | Ise et al. ................................ | 350/128 |
| 4,268,118 | 5/1981 | Palmquist et al. ..................... | 350/128 |
| 4,927,233 | 5/1990 | Nakanishi et al. .................... | 350/128 |
| 5,081,545 | 1/1992 | Sugawara et al. ..................... | 359/625 |
| 5,121,252 | 6/1992 | Okada et al. .......................... | 359/455 |
| 5,177,637 | 1/1993 | Tsukada ................................. | 359/599 |
| 5,196,960 | 3/1993 | Matsuzaki et al. .................... | 359/453 |
| 5,432,636 | 7/1995 | Ishii et al. ............................. | 359/460 |
| 5,519,539 | 5/1996 | Hoopman et al. ..................... | 359/741 |
| 5,615,045 | 3/1997 | Takuma et al. ........................ | 359/456 |
| 5,642,226 | 6/1997 | Rosenthal .............................. | 359/619 |

Primary Examiner—Safet Metjahic
Assistant Examiner—Christopher E. Mahoney
Attorney, Agent, or Firm—Parkhurst & Wendel, L.L.P.

[57]            ABSTRACT

A lenticular lens sheet for use as a rear projection screen, includes a base lenticular lens sheet having a surface provided with a plurality of lenticular elements, and a surface diffusing part having minute diffusing elements. The surface diffusing part is combined with the base lenticular lens sheet by laminating a plastic film having one surface provided with the minute diffusing elements to the base lenticular lens sheet so that the minute diffusing elements lie on the surfaces of the lenticular elements or by embossing the minute diffusing elements in the surfaces of the lenticular elements of the base lenticular lens sheet with an embossing plastic film having a surface of a shape complementary to the minute diffusing elements.

10 Claims, 15 Drawing Sheets

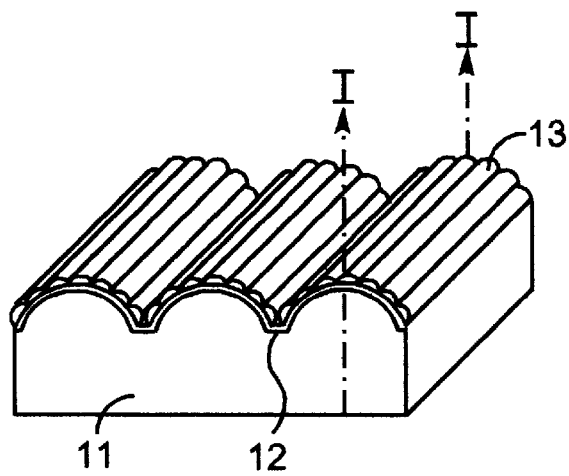
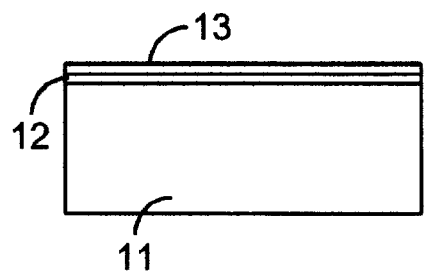
FIG. 1(A)  FIG. 1(B)
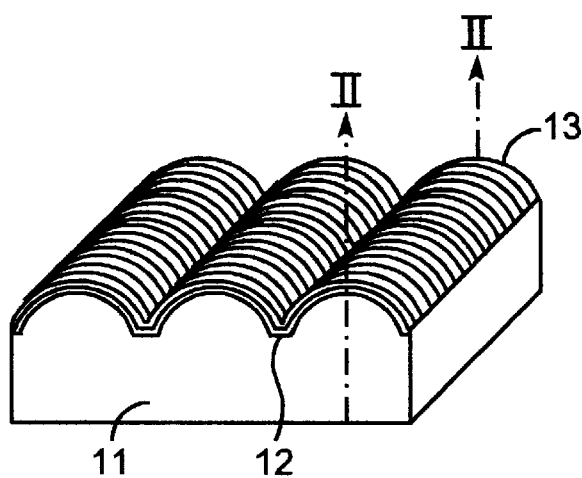
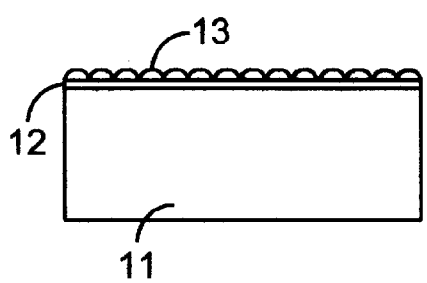
FIG. 1(C)  FIG. 1(D)

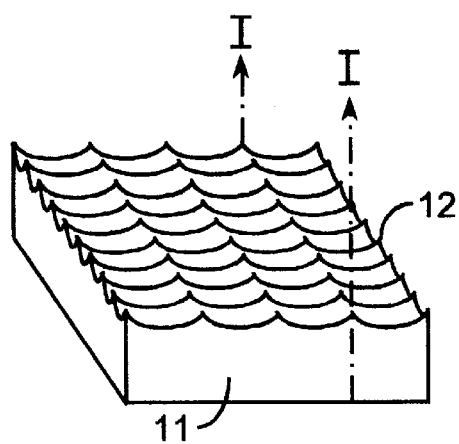 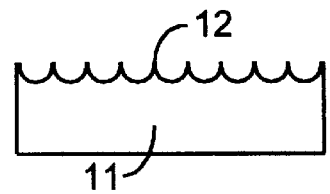
FIG. 6(A)    FIG. 6(B)
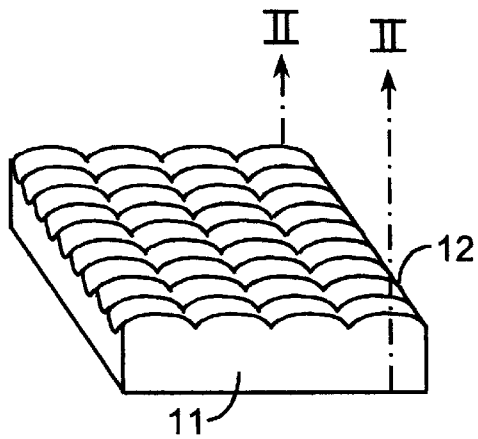 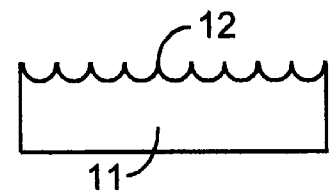
FIG. 6(C)    FIG. 6(D)
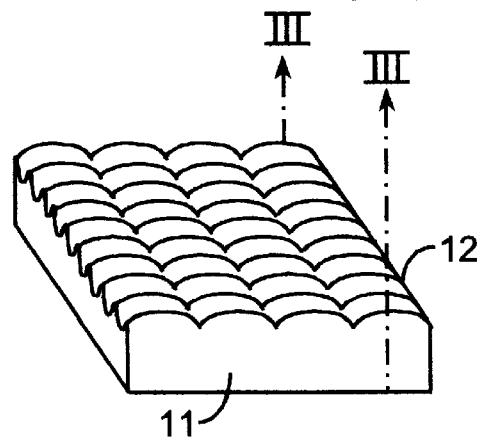 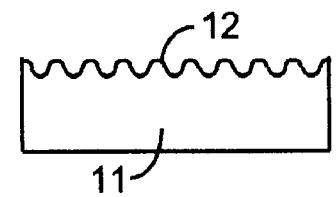
FIG. 6(E)    FIG. 6(F)

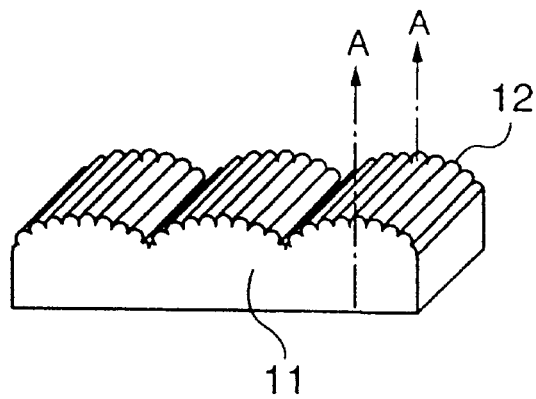
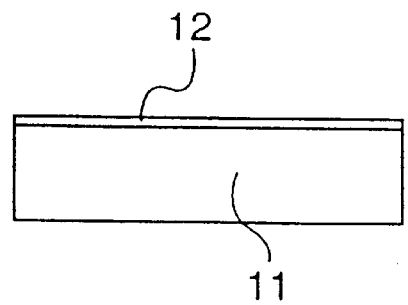
FIG. 12(A)  FIG. 12(B)
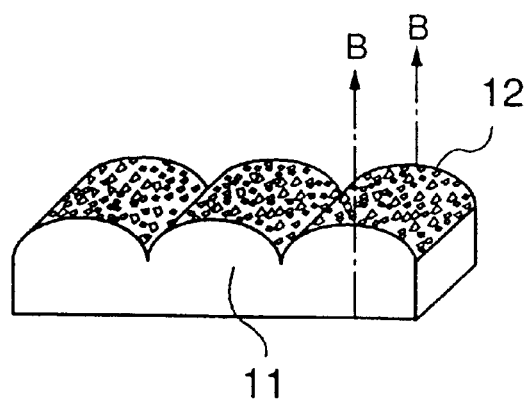
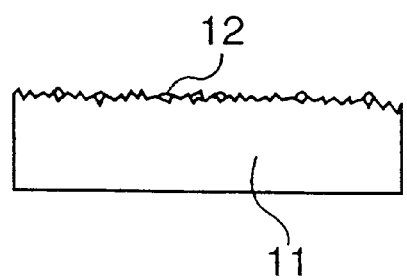
FIG. 12(C)  FIG. 12(D)

LENTICULAR LENS SHEET WITH BOTH A BASE SHEET HAVING LENTICULAR ELEMENTS AND A SURFACE DIFFUSING PART HAVING ELEMENTS OF ELEMENTARY SHAPE SMALLER THAN LENTICULAR ELEMENTS

BACKGROUND OF THE INVENTION

1. Field of the Invention

The present invention relates to a lenticular lens sheet to be used as the so-called rear projection screen for television which displays an image projected thereon from behind for observation from the front side thereof and, more particularly, to a lenticular lens sheet whose optical characteristics can be changed when used in combination with a Fresnel lens to form a rear projection screen.

2. Description of the Related Art

A lenticular lens sheet to be used as a screen for a rear projection television set, in which an image is projected on the screen from the back side of the screen and the image displayed on the screen is watched from the front side of the screen, is manufactured by the extrusion molding the press forming of a resin material prepared by kneading a mixture of a transparent or translucent base resin and a diffusing agent.

Such a lenticular lens sheet has a light entrance surface provided with linear lenticular elements having a cross section of a shape resembling a portion of a circle or an ellipse, and a light exit surface provided with a lens formed by alternately arranging shading black stripes and lenticular elements having a cross section of a shape resembling a portion of a circle or an ellipse. The lenticular elements of the light entrance surface and those of the light exit surface are formed integrally.

When manufacturing the conventional lenticular lens, the shape of the lenticular elements is designed according to desired optical characteristics of the lenticular lens, a die for molding the lenticular lens is fabricated on the basis of optical design data on the lenticular elements, and a resin is molded in the die to obtain the lenticular lens. However, it is very difficult to fabricate the die accurately conforming to the optical design data by state-of-the-art die fabricating techniques. For example, the sectional shape of the lenticular elements formed in the light entrance surface of the lenticular lens sheet is a half or a quarter of a circle of a radius in the range of 0.1 to 0.2 mm or a half of an ellipse. It is hardly possible to form accurately lenticular elements of a shape more complicated and minuter than the lenticular elements of the foregoing shape and size by state-of-the-art die fabricating techniques. When it is desired to obtain a lenticular lens sheet having further complicated optical characteristics, available means for adjusting the optical characteristics of the lenticular lens sheet have been only changing the diffusing agent contained in the resin material, changing the diffusing agent content of the resin base and/or changing the dimensions of the cross section of the lenticular elements which is a portion of a circle or an ellipse.

Some lenticular lens sheet is formed by putting together two lenticular lens sheets having linear lenticular elements with their lenticular elements extended perpendicularly to each other.

The rear projection screen using the conventional lenticular lens sheet is provided with linear lenticular elements. Therefore, the rear projection screen has uniform light exit characteristic for incident light rays falling on the light entrance surface at different incident angles, and the distribution of outgoing light rays is controlled in a limit range. Such problems may be solved by using a lenticular lens sheet formed by putting together two lenticular lens sheets having linear lenticular elements with their lenticular elements extended perpendicularly to each other, which unavoidably entails a light loss and increase in material cost because two lenticular lens sheets are used in two layers.

The lenticular lens sheet may be provided with lenses similar to a compound eye. However, it is very difficult for state-of-the-art die fabricating techniques, which form linear grooves of a circular cross section in a workpiece to form a die with the tip of a cutting tool, to fabricate a die for forming a lenticular lens sheet having lenticular elements having surfaces provided with minute ridges and furrows far smaller than those of the conventional lenticular lens sheet so as to conform accurately to optical design data. Use of an engraving process and a grinding process for fabricating a die will increases the costs of the die greatly.

SUMMARY OF THE INVENTION

Accordingly, it is an object of the present invention to provide a lenticular lens sheet provided with lenticular elements of a complicated, minute, elaborate shape which could not have been formed.

Another object of the present invention is to provide a method of fabricating a lenticular lens sheet provided with lenticular elements of a complicated, minute, elaborate shape which could not have been formed.

A lenticular lens sheet of the present invention having lenticular elements of a minute construction and excellent optical characteristics can be formed by a special method different from the conventional method without requiring an increase in the dimensional accuracy of a die.

A lenticular lens sheet of the present invention is intended to be used as a rear projection screen.

According to a first aspect of the present invention, a lenticular lens sheet comprises a base lenticular lens sheet having a light entrance surface provided with a plurality of lenticular elements, and a surface diffusing part having minute diffusing elements minuter than the lenticular elements and formed on the surfaces of the lenticular elements of the base lenticular lens sheet.

According to a second aspect of the present invention, a lenticular lens sheet comprises a base lenticular lens sheet provided on one surface thereof with lenticular elements, and a plastic film provided on one surface thereof with minute diffusing elements of an ionizing radiation setting resin, such as an ultraviolet setting resin (UV setting resin) or an electron beam setting resin (EB setting resin), and laminated to the base lenticular lens sheet.

According to a third aspect of the present invention, a lenticular lens sheet comprises a base lenticular lens sheet provided on one surface thereof with lenticular elements, and a surface diffusing part having minute diffusing elements minuter than the lenticular elements, and formed on the surfaces of the lenticular elements of the base lenticular lens sheet so as to extend perpendicularly to the lenticular elements of the base lenticular lens sheet by press working.

According to a fourth aspect of the present invention, a lenticular lens sheet comprises a base lenticular lens sheet having on one surface thereof lenticular elements provided with minute diffusing elements formed in the surfaces thereof by press working.

A method of fabricating a lenticular lens sheet comprising a base lenticular lens sheet provided on one surface thereof with lenticular elements, and a plastic film provided with a surface diffusing part having minute diffusing elements of an ionizing radiation setting resin, such as an UV setting resin or an electron beam setting resin, and laminated to the base lenticular lens sheet comprises the steps of:

(a) forming a plastic film provided on one surface thereof with a surface diffusing part having minute diffusing elements of an ionizing radiation setting resin by spreading the ionizing radiation setting resin over the circumference of a first roller having a circumference of a shape complementary to the minute diffusing elements, feeding a transparent or translucent plastic film onto the circumference of the first roller so as to wrap closely around the circumference of the first roller coated with the ionizing radiation setting resin and irradiating the ionizing radiation setting resin through the plastic film with ionizing radiation to set the ionizing radiation setting resin in minute diffusing elements on the surface of the plastic film; and (b) laminating the plastic film provided with the minute diffusing elements of the ionizing radiation setting resin to a thermoplastic resin sheet forming a base lenticular lens sheet by feeding the plastic film and the thermoplastic resin layer forming the base lenticular lens sheet between a pair of second rollers, at least one of which having a circumference of an engraved shape complementary to a lenticular lens and formed by sinking, with the surface of the plastic film provided with the minute diffusing elements in contact with the circumference of the second roller having the circumference of the engraved shape.

A method of fabricating a lenticular lens sheet comprising a base lenticular lens sheet having a surface provided with an arrangement of a plurality of lenticular elements integrally provided in their surfaces with minute diffusing elements far minuter than the lenticular elements comprises the steps of:

(a) forming an embossing plastic film provided on one surface thereof with an embossing element of an ionizing radiation setting resin of a shape complementary to the minute diffusing elements by spreading the ionizing radiation setting resin over the circumference of a first roller having a shape complementary to the minute diffusing elements, feeding a transparent or translucent plastic film onto the circumference of the first roller so as to wrap closely around the circumference of the first roller coated with the ionizing radiation setting resin and irradiating the ionizing radiation setting resin through the plastic film with ionizing radiation to set the ionizing radiation setting resin in a shape complementary to the minute diffusing elements on the surface of the plastic film;

(b) temporarily laminating the embossing plastic film provided with the embossing element of the ionizing radiation setting resin of a shape complementary to the minute diffusing elements to a thermoplastic resin sheet forming a base lenticular lens sheet by feeding the embossing plastic film and the thermoplastic resin sheet and compressing the same between a pair of second rollers with the surface of the embossing plastic film provided with the embossing element in contact with the thermoplastic resin sheet; and (c) setting the thermoplastic resin sheet and separating the embossing plastic film from the thermoplastic resin sheet.

The above and other objects, features and advantages of the present invention will become more apparent from the following description taken in connection with the accompanying drawings.

As mentioned above, an example of an ionizing radiation setting resin is an ultraviolet (UV setting resin) or an electron beam setting resin (EB setting resin).

BRIEF DESCRIPTION OF THE DRAWINGS

FIGS. 1(A) and 1(B) are a perspective view and a side view of a lenticular lens sheet in a first embodiment according to the present invention;

FIGS. 1(C) and (1D) are a perspective view and a side view of a lenticular lens sheet in a modification of the lenticular lens sheet of FIG. 1(A);

FIGS. 6(A) and 6(B) are perspective view and a sectional view of a lenticular lens sheet in a second embodiment according to the present invention;

FIGS. 6(C) and 6(D) are perspective view and a sectional view of a lenticular lens sheet in a modification of the lenticular lens sheet of FIG. 6(A);

FIGS. 6(E) and 6(F) are perspective view and a sectional view of a lenticular lens sheet in a modification of the lenticular lens sheet of FIG. 6(A);

FIGS. 12(A) and 12(B) are perspective view and a sectional view of a lenticular lens sheet in a third embodiment according to the present invention;

FIG. 12(C) and 12(D) are perspective view and a sectional view of a lenticular lens sheet in a fourth embodiment according to the present invention;

DETAILED DESCRIPTION OF THE PREFERRED EMBODIMENTS

Figure 2A:
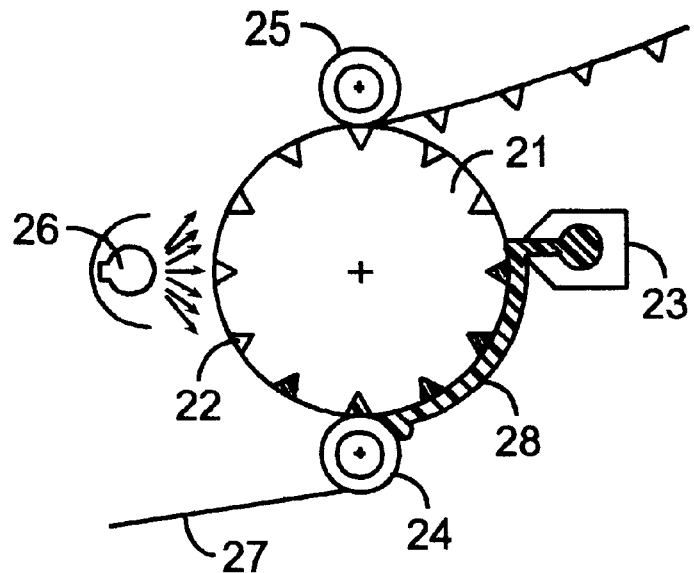
FIG. 2(A) is a schematic view of a mechanical arrangement to be used in a process of fabricating a plastic film provided on a surface thereof with minute diffusing elements.

A lenticular lens sheet in a first embodiment according to the present invention will be described with reference to FIGS. 1 to 5.

Referring to FIG. 1(A), a lenticular lens sheet in a first embodiment according to the present invention has a base lenticular lens sheet 11 having a rear surface, i.e., a light entrance surface, provided with regularly arranged parallel lenticular elements extending along the length of the base lenticular lens sheet 11, and a plastic film 12 having a surface provided with regularly arranged minute ridges 13 of a semicircular cross section and laminated to the rear surface provided with the lenticular elements of the base lenticular lens sheet 11 with the minute ridges 13 extended in parallel to the lenticular elements of the base lenticular lens sheet 11.

Referring to FIG. 1(C), a lenticular lens sheet in a modification of the lenticular lens sheet in the first embodiment has a base lenticular lens sheet 11 having a rear surface, i.e., a light entrance surface, provided with regularly arranged parallel lenticular elements extending along the length of the base lenticular lens sheet 11, and a plastic film 12 having a surface provided with regularly arranged minute ridges 13 of a semicircular cross section and laminated to the rear surface provided with the lenticular elements of the base lenticular lens sheet 11 with the minute ridges 13 extended substantially perpendicularly to the lenticular elements of the base lenticular lens sheet 11.

The surfaces of the lenticular elements of the base lenticular lens sheets 11 in the first embodiment may be provided with minute diffusing elements other than the minute ridges 13 of a semicircular cross section, such as minute circular cones, minute pyramids, minute grains, minute meshes or an artificial, abstract pattern.

The term, "minute diffusing elements" used herein signifies diffusing elements of sizes far smaller than the pitches of the lenticular elements of the base lenticular lens sheet 11 and the minuteness of the minute diffusing elements is not specified by any fixed range of size. Usually, pitches of the elemental figure of a repeating pattern that can be formed in the surface of a film is in the range of 1 to 200 μm.

Each of the lenticular lens sheets shown in FIGS. 1(A) and 1(D) is formed by laminating the plastic film 12 having a surface provided with the minute ridges 13 of an UV setting resin, i.e., an ionizing radiation setting resin, to the base lenticular lens sheet 11 simultaneously with the formation of the base lenticular lens sheet 11 by extruding a thermoplastic resin.

The UV setting resin is an epoxy resin, a polyester resin, an acrylic resin, a urethane acrylate resin or the like. The plastic film to be laminated to the base lenticular lens sheet 11 may be any suitable plastic film provided that the plastic film is transparent and has a high transmittance with ionizing radiation, such as electron beams or UV rays (UV rays). Suitable films as the film 12 are, for example, a polyethylene terephthalate resin film (PET film), a polyamide resin film, a polymethyl methacrylate resin film, a polyvinyl chloride resin film, a polycarbonate resin film, a polystyrene resin film, and a polyolefin resin film. These films may be coated with a primer to secure the firm adhesion of the UV setting resin thereto.

Usually, the base lenticular lens sheet 11 is made of a material prepared by dispersing a diffusing agent, such as silica or an organic crosslinking resin, in a thermoplastic resin having a high light transmittance, such as an acrylic resin.

Referring to FIG. 2(A) showing a mechanical arrangement for forming the minute ridges 13 on the plastic film of the lenticular lens sheet of FIG. 1(A), a first roller 21 is provided in its circumference with parallel, axial minute grooves 22 of a shape complementary to the minute ridges 13. An extrusion nozzle 23 generally employed in a coating apparatus and a coater is disposed near the first roller 21 to feed a liquid UV setting resin 28, i.e., an ionizing radiation setting resin, onto the circumference of the first roller 21. When set, the UV setting resin 28 is hardly subject to deformation by heat or pressure. The UV setting resin 28 may be spread over either the circumference of the first roller 21 or the surface of the plastic film. It is important to spread the liquid UV setting resin 28 so that portions of the liquid UV setting resin 28 filling up the axial minute grooves 22 do not contain any bubbles. Pressure rollers 24 and 25 are disposed in contact with the circumference of the first roller 21 to wrap a plastic film 27 around the circumference of the first roller 21. An UV radiating device (UV radiating device) 26 is disposed diametrically opposite to the extrusion nozzle 23.

The plastic film 27 supplied from below the first roller 21 is pressed against the circumference of the first roller 21 by the pressure roller 24 so that the film 27 comes into contact with the UV setting resin 28 filling up the minute grooves 22, whereby the surface of the film 27 is wetted by the liquid UV setting resin 28. The UV radiating device 26 irradiates the UV setting resin 28 through the plastic film 27 as the plastic film 27 moves past the UV radiating device 26. Consequently, the UV setting resin 28 adhering to the plastic film 27 is set to form the minute ridges 13 fixedly attached to the surface of the plastic film 27. The plastic film 27 provided with the minute ridges 13 is separated from the first roller 21 after the same has passed the pressure roller 25, and is taken up in a roll.

Figure 2B:
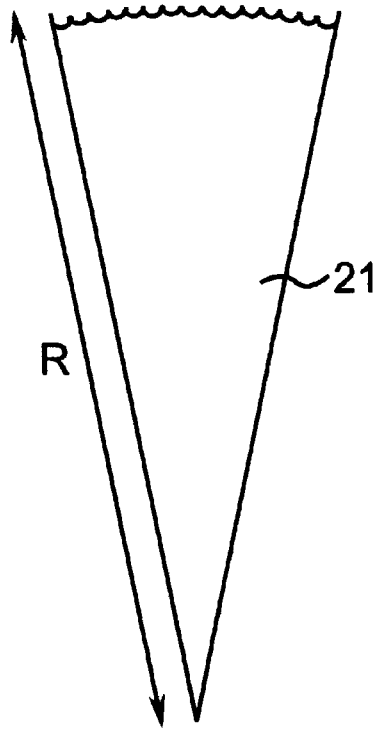
FIG. 2(B) is a fragmentary sectional view of a first embossed roller.
Figure 3:
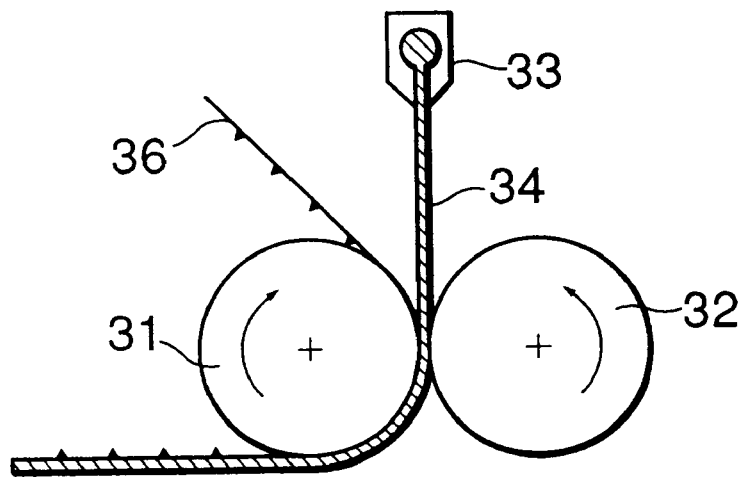
FIG. 3(A) is a schematic view of a mechanical arrangement to be used in a process of forming a base lenticular lens sheet and laminating a plastic film having a surface provided with minute diffusing elements to the base lenticular lens sheet.
FIG. 3(B) is a schematic view of a mechanical arrangement to be used in another process of forming a base lenticular lens sheet and laminating two plastic films each having a surface provided with minute diffusing elements to the base lenticular lens sheet.
Figure 3:
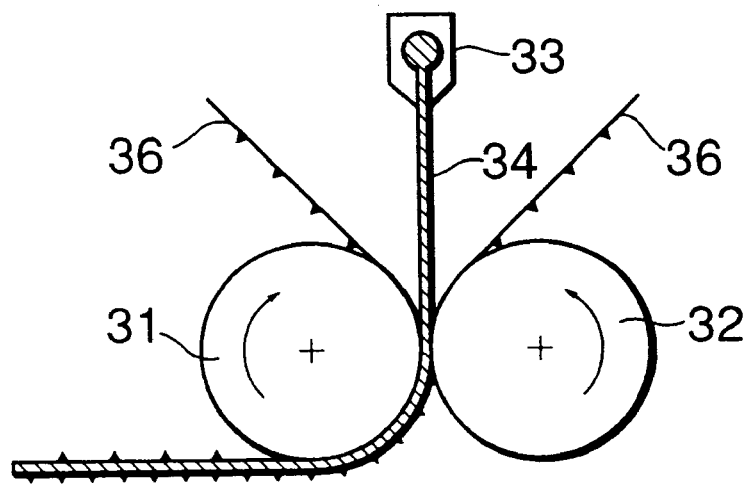

The ridges and furrows can be formed in the circumference of the first roller 21 by a well-known etching process or an electrochemcial molding process. When forming the plastic film provided with the ridges 13 for the lenticular lens sheet shown in FIG. 1(A), the first roller 21 is provided with a plurality of parallel minute circumferential grooves. When forming the plastic film provided with the minute ridges 13 for the lenticular lens sheet shown in FIG. 1(B), the first roller 21 is provided with a plurality of parallel, axial minute grooves as shown in FIGS. 2(A) and 2(B).

Although it is difficult to engrave the minute grooves in the circumference of an embossed roller provided with grooves complementary to lenticular elements, the minute grooves can easily be engraved in the circumference of a roller not provided with any grooves complementary to lenticular elements by ordinary industrial techniques.

FIG. 3(A) shows a mechanical arrangement for carrying out a lenticular lens sheet fabricating method in accordance with the present invention for forming a base lenticular lens sheet and laminating a plastic film provided with minute ridges to the rear surface, i.e., a light entrance surface, of the base lenticular lens sheet.

Referring to FIG. 3(A), a second roller 31 is provided in its circumference with a plurality of circumferential grooves complementary to lenticular elements to be embossed in a rear surface of a base lenticular lens sheet 34, and arranged at an axial pitch in the range of about 0.1 to about 0.2 mm. A pressure roller 32 serving also as a cooling roller is pressed against the second roller 31. A plastic film 36 provided with minute ridges is fed between the second roller 31 and the pressure roller 32 so as to wrap around the second roller 31, and a molten acrylic resin is extruded through a T-die 33 between the back surface of the plastic film 36 and the pressure roller 32 to form the base lenticular lens sheet 34. The pressure roller 32 may be provided in its circumference with an engraving complementary to lenticular elements different from those to be embossed in the rear surface of the base lenticular lens sheet 34 to emboss the lenticular elements in the front surface of the base lenticular lens sheet 34. The second roller 31 embosses the lenticular elements in the rear surface of the base lenticular lens sheet 34, the base lenticular lens sheet 34 and the plastic film 36 are compressed between the second roller 31 and the pressure roller 32 to laminate the plastic film 36 to the base lenticular lens sheet 34 to form a lenticular lens sheet, and the pressure roller 32 cools the base lenticular lens sheet 34. Usually, black stripes, i.e., shading strips, are printed on the lenticular lens sheet thus fabricated, and then the lenticular lens sheet is cut into rear projection screens of a desired size.

FIG. 3(B) shows a mechanical arrangement for carrying out a lenticular lens sheet fabricating method in accordance with the present invention for forming a base lenticular lens sheet 11 and laminating two plastic films provided with minute ridges to the opposite surfaces of the base lenticular lens sheet, respectively. Referring to FIG. 3(B), a second roller 31, similarly to the second roller 31 shown in FIG. 3(A), is provided in its circumference with a plurality of circumferential grooves complementary to lenticular elements to be embossed in a front surface of a base lenticular lens sheet 34 formed by extruding a molten resin through a T-die 33. A pressure roller 32 serving also as a cooling roller is pressed against the second roller 31. The base lenticular lens sheet 34 is fed between the second roller 31 and the pressure roller 32 so as to wrap around the second roller 31. Two plastic films 36 provided with minute ridges are fed between the second roller 31 and the base lenticular lens sheet 34 and between the base lenticular lens sheet 34 and the pressure roller 32, respectively, and the base lenticular lens sheet 34 and the two plastic films 36 are compressed between the second roller 31 and the pressure roller 32 to laminate the plastic films 36 to the base lenticular lens sheet 34. Usually, black stripes are printed on a lenticular lens sheet thus fabricated, and then the lenticular lens sheet is cut into rear projection screens of a desired size.

The base lenticular lens sheet 34 of each of the foregoing lenticular lens sheets may be provided in its rear surface with V-lenticular elements, i.e., linear lenticular elements of a V-shaped cross section, polygonal lenticular elements, i.e., linear lenticular elements of a polygonal cross section, granular diffusing elements or the like instead of the linear lenticular elements having a semicircular cross section. If the base lenticular lens sheet 34 is provided with the lenticular elements extending along the length thereof and minute ridges parallel to the lenticular elements are to be formed in the surfaces of the lenticular elements, a plastic film provided with ridges parallel to the length thereof is used. If the base lenticular lens sheet 34 is provided with the lenticular elements extending perpendicularly to the length thereof and minute ridges perpendicular to the lenticular elements are to be formed in the surfaces of the lenticular elements, a plastic film provided with ridges perpendicular to the length thereof is used.

An embossing plastic film of a thickness excessively great as compared with the pitches of the lenticular elements formed on the base lenticular lens sheet is unable to conform satisfactorily to the surfaces of the lenticular elements. Therefore, the plastic film must have an appropriate thickness, must be capable of being stretched to some extent when heated, and must be made of a resin capable of firmly adhering to the base lenticular lens sheet.

Examples of the foregoing embodiment will be described hereinafter.

Manufacture of Plastic Film with Minute Ridges

The first roller 21 of FIG. 2(A) was provided in its circumference with parallel axial grooves of a semicircular cross section of 20 μm in height as shown in FIG. 2(B) arranged at a circumferential pitch of 20 μm. The first roller 21 was set in the mechanical arrangement shown in FIG. 2(A). A urethane acrylate resin (XD-808 available from Dainichi Seika Kogyo K.K.) 28, i.e., an UV setting resin, was fed between the first roller 21 and an 80 μm thick vinyl chloride film (W-500 available from Riken Biniru Kogyo K.K.) 27. As the vinyl chloride film 27 moves past the UV radiating device 26, the UV radiating device 26 irradiated the urethane acrylate resin 28 through the vinyl chloride film 27 to set the urethane acrylate resin 28. A plastic film 36, i.e., the vinyl chloride film 27 provided with the ridges, was separated from the first roller 21. The plastic film 36 was provided with linear ridges of a semicircular cross section of 20 μm in height arranged at a pitch of 20 μm.

Formation of Base Lenticular Lens Sheet and Lamination of Plastic Film to Base Lenticular Lens Sheet The plastic film 36 was laminated to the rear surface of a base lenticular lens sheet 34 by the mechanical arrangement shown in FIG. 3(A). The base lenticular lens sheet 34 was made of a mixture of an impact-resistant acrylic resin pellets and five parts glass beads of about 15 μm in particle size. A second roller provided in its circumference with circumferential grooves of an elliptic cross section of 50 μm in height arranged at an axial pitch of 800 μm was used as the embossed roller 31 of the mechanical arrangement shown in FIG. 3(A). The plastic film 36, i.e., the vinyl chloride film provided with the minute ridges, was fed so that the front surface provided with the minute ridges is in contact with the second roller 31 and the back surface in contact with the rear surface of a base lenticular lens sheet 34 of an acrylic resin, and the plastic film 36 and the base lenticular lens sheet 34 were compressed between the second roller 31 and the pressure roller 32 to emboss longitudinal lenticular elements in the rear surface of the base lenticular lens sheet 34 and to laminate the plastic film 36 to the rear surface of the base lenticular lens sheet 34. The width of the slit of the T-die 33 was adjusted so that the mixture of the impact-resistant acrylic resin pellets and the glass beads extruded at a predetermined speed of 2.5 m/min forms the base lenticular lens sheet 34 in a thickness of 0.9 mm. Thus, a lenticular lens sheet as shown in FIG. 1(C) was fabricated.

A lenticular lens sheet having a base lenticular lens sheet 34 provided with longitudinal lenticular elements, and plastic sheet 36 laminated to the base lenticular lens sheet 34 with the minute ridges extended in parallel to the lenticular elements of the base lenticular lens sheet 34 as shown in FIG. 1(A) was fabricated by the same method.

Figure 4A:
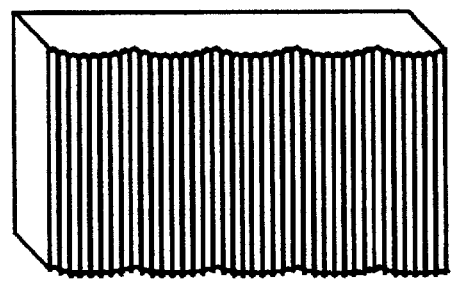
FIGS. 4(A) and 4(B) are respectively a lenticular lens sheet and a graph showing a luminance distribution on the light exit surface of the lenticular lens sheet of FIG. 1(A) having straight lenticular elements provided in their surfaces with longitudinal, parallel minute ridges parallel to the lenticular elements, when light rays fall on the light entrance surface of the lenticular lens sheet.
Figure 4B:
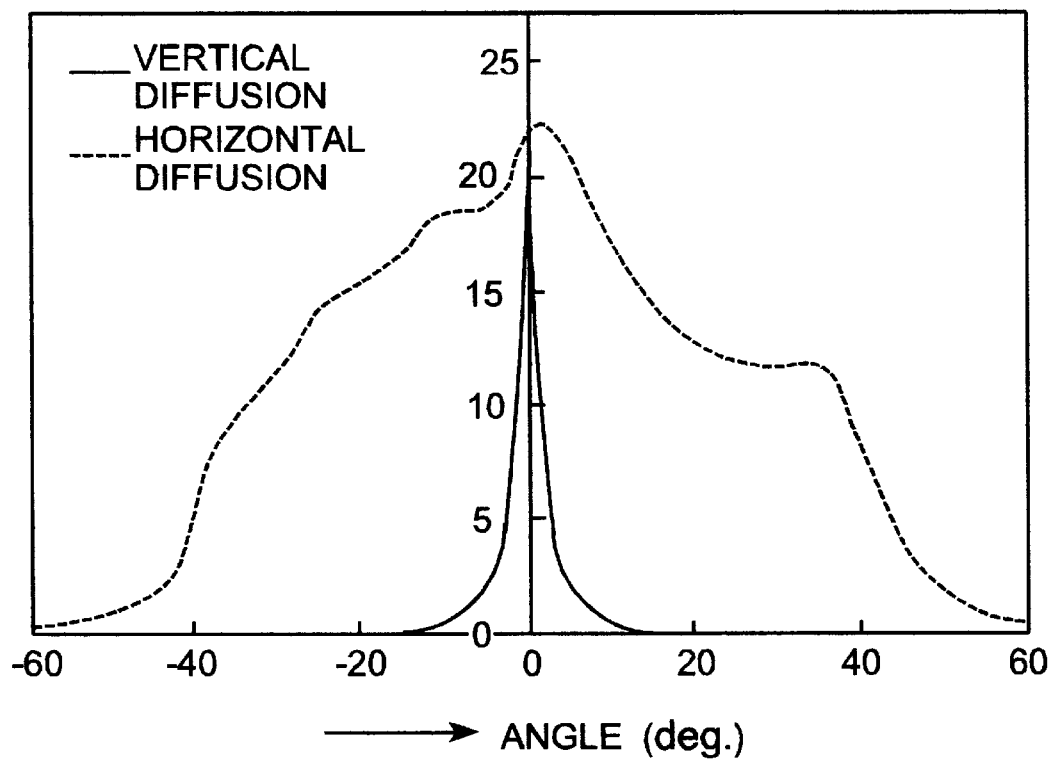
Figure 5A:
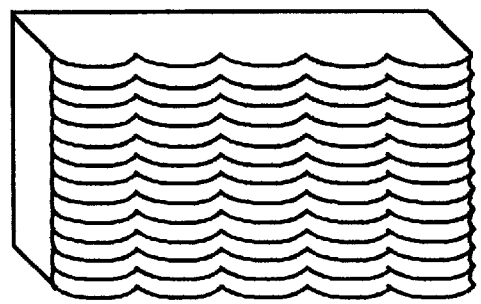
FIGS. 5(A) and 5(B) are respectively a lenticular lens sheet and a graph showing a luminance distribution on the light exit surface of the lenticular lens sheet of FIG. 1(B) having straight lenticular elements provided in their surfaces with transverse, parallel minute ridges perpendicular to the lenticular elements, when light rays fall on the light entrance surface of the lenticular lens sheet.
Figure 5B:
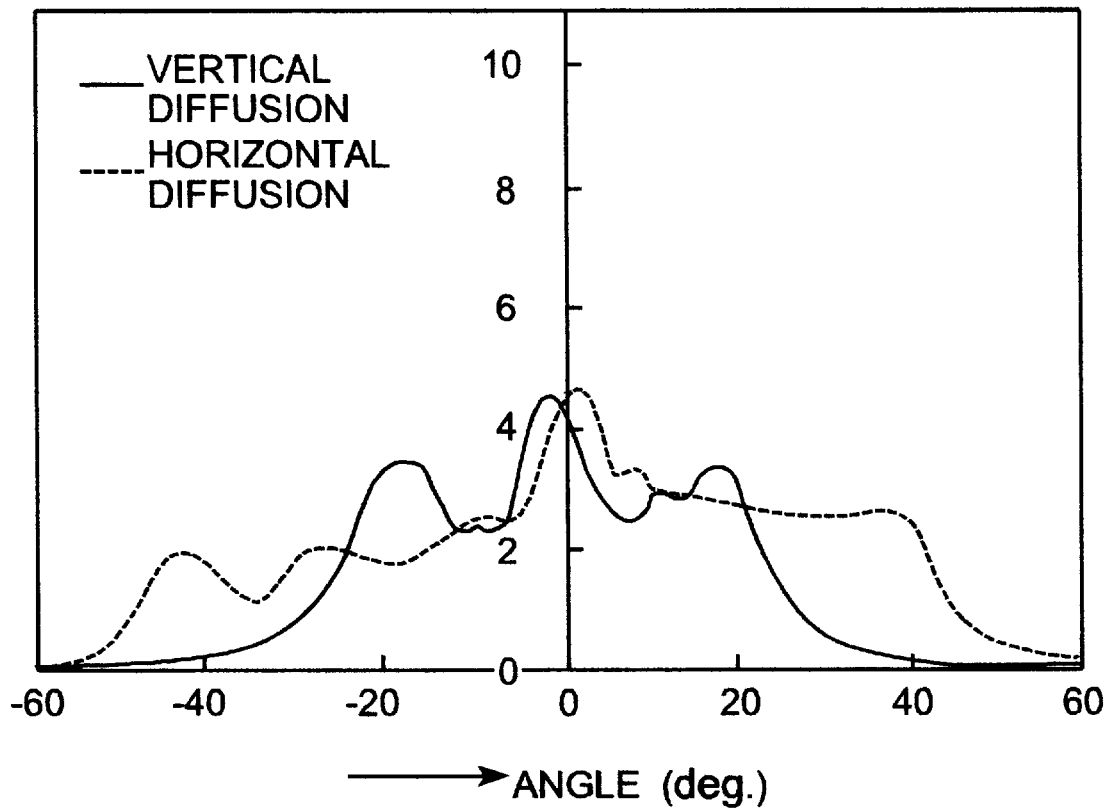

Luminance distributions on the light exit surfaces of the lenticular lens sheets of FIGS. 1(A) and 1(D) were measured. Measured results are shown in FIGS. 4 and 5. As shown in FIGS. 4(B) and 5(B), the luminance distributions are relatively irregular because the pitches of the diffusing elements, i.e., the minute ridges, are relatively great, and do not necessarily indicate ideal lenticular lens characteristics. The diffusion characteristics of those lenticular lens sheets may be improved by reducing the pitches of the minute diffusing elements and providing the lenticular lens sheets with diffusing elements of an improved shape.

Since the lenticular lens sheets of the present invention are provided with the minute diffusing elements in the surfaces of the lenticular elements of the base lenticular lens sheet, light is scattered in all directions from the lenticular elements, so that the side gain is improved. Since the minute diffusing elements can easily be formed in the surfaces of the lenticular elements of the lenticular lens sheet of the present invention, which has been impossible due to restrictions on die manufacturing techniques, by laminating the plastic film provided with the minute diffusing elements to the base lenticular lens sheet provided with the lenticular elements and the material forming the base lenticular lens sheet need not contain any diffusing agent, a satisfactory diffusing effect can be exercised without entailing reduction in the light transmittance of the lenticular lens sheet attributable to the effect of a diffusing agent.

Lenticular lens sheets in a third, a fourth and a fifth embodiments according to the present invention will be described with reference to FIGS. 6 to 11.

FIGS. 6(A) to 6(F) are perspective views and sectional views of lenticular lens sheets in a third embodiment according to the present invention and those in modifications of the lenticular lens sheet of FIG. 6(A).

The base lenticular lens sheet 11 of a lenticular lens sheet in the third embodiment shown in FIG. 6(A) has concave lenticular elements having surfaces provided with minute grooves 12 extending perpendicularly to the lenticular grooves, the base lenticular lens sheet 11 of the lenticular lens sheet shown in FIG. 6(C) has convex lenticular elements having surfaces provided with minute grooves 12 extending perpendicularly to the convex lenticular elements, and the base lenticular lens sheet 11 of a lenticular lens sheet in the fifth embodiment shown in FIG. 6(E) has convex lenticular elements having surfaces provided with minute ridges 12 extending perpendicularly to the convex lenticular elements. Each of the lenticular lens sheets shown in FIGS. 6(A) to 6(E) is fabricated by pressing an embossing plastic film provided with minute diffusing elements of an ionizing radiation setting resin complementary to diffusing elements i.e., the minute grooves 12 or the minute ridges 12, to be formed in the surfaces of the lenticular elements of the base lenticular lens sheet 11, against the surfaces of the lenticular elements of the base lenticular lens sheet 11 while the base lenticular lens sheet 11 is hot and plastic, and separating the embossing plastic film after the base lenticular lens sheet 11 has been cooled. The ionizing radiation setting resin forming the minute diffusing elements on the plastic film may be the same as that employed in forming the minute diffusing elements on the embossing plastic film in the first embodiment.

The plastic film of the embossing plastic film for embossing the minute diffusing elements into the surfaces of the lenticular elements of the base lenticular lens sheet 11 may be any suitable plastic film provided that the plastic film has a high transmittance with ionizing radiation, such as electron beams or UV rays, and is easily separable from the base lenticular lens sheet 11. Suitable films as the plastic film are, for example, those of a PET resin, a polyamide resin, a polyolefin resin and the like. These films may be coated with a releasing agent to facilitate the separation of the embossing plastic film from the base lenticular lens sheet 11.

Usually, the base lenticular lens sheet 11 is formed of a mixture of a resin having a high light transmittance, such as an acrylic resin, and a diffusing agent.

Figure 7:
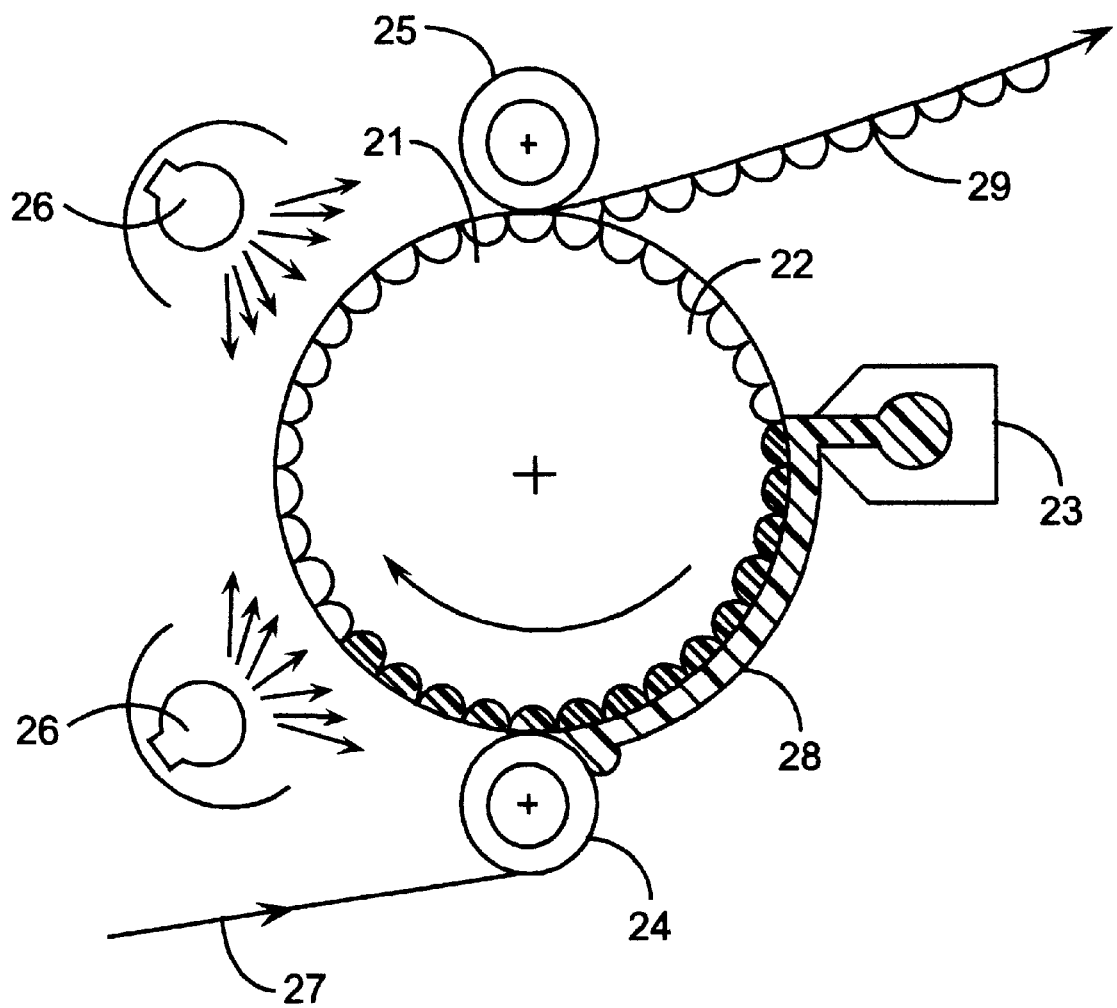
FIG. 7 is a schematic view of a mechanical arrangement to be used in a process of forming an embossing plastic film having a surface of a shape complementary to minute diffusing elements, in accordance with the present invention.

Referring to FIG. 7 showing a mechanical arrangement for forming an embossing plastic film provided with minute ridges on a surface thereof, in accordance with the present invention, a first roller 21 is provided in its circumference with axial grooves 22 of a shape corresponding to that of minute grooves to be embossed in the surfaces of the lenticular elements. The embossing plastic film formed by using the first roller 21 has minute ridges extending across the width thereof. Usually, the linear lenticular elements of the base lenticular lens sheet are formed longitudinally, i.e., in parallel to the length of the base lenticular lens sheet, because it is easier to position the base lenticular lens sheet relative to and to separate the same from an embossed roller for forming the linear lenticular elements in the surface of the base lenticular lens sheet when the linear lenticular elements are formed longitudinally than when the same are formed across the base lenticular lens sheet. If it is desired to form minute ridges 12 in the surfaces of the lenticular elements of the base lenticular lens sheet 11 as shown in FIG. 6(C), a first roller 21 provided in its circumference with axial ridges corresponding to the minute ridges 12 is used for forming an embossing plastic film provided with minute grooves complementary to the minute ridges 12.

An extrusion nozzle 23 generally employed in a coating apparatus and a coater is disposed near the first roller 21 to feed a liquid UV setting resin 28, i.e., an ionizing radiation setting resin, onto the circumference of the first roller 21. When set, the UV setting resin 28 is hardly subject to deformation by heat or pressure. The UV setting resin 28 may be spread over either the circumference of the first roller 21 or the surface of the plastic film. It is important to spread the liquid UV setting resin 28 so that portions of the liquid UV setting resin 28 filling up the axial minute grooves 22 do not contain any bubbles. Pressure rollers 24 and 25 are disposed in contact with the circumference of the first roller 21 to wrap a plastic film 27 around the circumference of the first roller 21. An UV radiating device 26 is disposed diametrically opposite to the extrusion nozzle 23.

The plastic film 27 supplied from below the first roller 21 is pressed against the circumference of the first roller 21 by the pressure roller 24 so that the film 27 comes into contact with the UV setting resin 28 filling up the minute grooves 22, whereby the surface of the film 27 is wetted by the liquid UV setting resin 28. The UV radiating device 26 irradiates the UV setting resin 28 through the plastic film 27 as the plastic film 27 moves past the UV radiating device 26. Consequently, the UV setting resin 28 adhering to the plastic film 27 is set to form minute ridges 29 fixedly attached to the surface of the plastic film 27. The plastic film 27 provided with the minute ridges 29 is separated from the first roller 21 after the same has passed the pressure roller 25, and is taken up in a roll. The first roller 21 shown in FIG. 7 is provided in its circumference with axial minute grooves 22 to form minute ridges of an UV setting resin on a surface of a plastic film to form an embossing plastic film for forming minute grooves in the surfaces of the lenticular elements of a base lenticular lens sheet so as to extend perpendicularly to the lenticular elements. The grooves can be formed in the circumference of the first roller 21 by a well-known etching process, a grinding process or an electrochemcial molding process. Although it is difficult to engrave the minute grooves in the circumference of an embossed roller provided with grooves complementary to lenticular elements, the minute grooves can easily be engraved in the circumference of a roller not provided with any grooves complementary to lenticular elements by ordinary industrial techniques.

Figure 8:
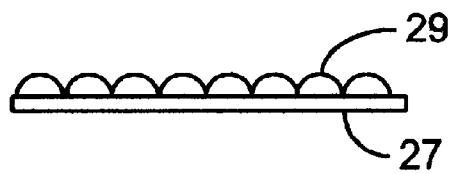
FIG. 8 is a sectional view of an embossing plastic film having a surface of a shape complementary to minute diffusing elements to be formed, to be employed by a method of fabricating a lenticular lens sheet, in accordance with the present invention.

A description will be given of a process of embossing minute grooves in the surfaces of lenticular elements formed on a surface of a base lenticular lens sheet by using the embossing plastic sheet thus provided with the minute ridges 29 as shown in FIG. 8.

Figure 9:
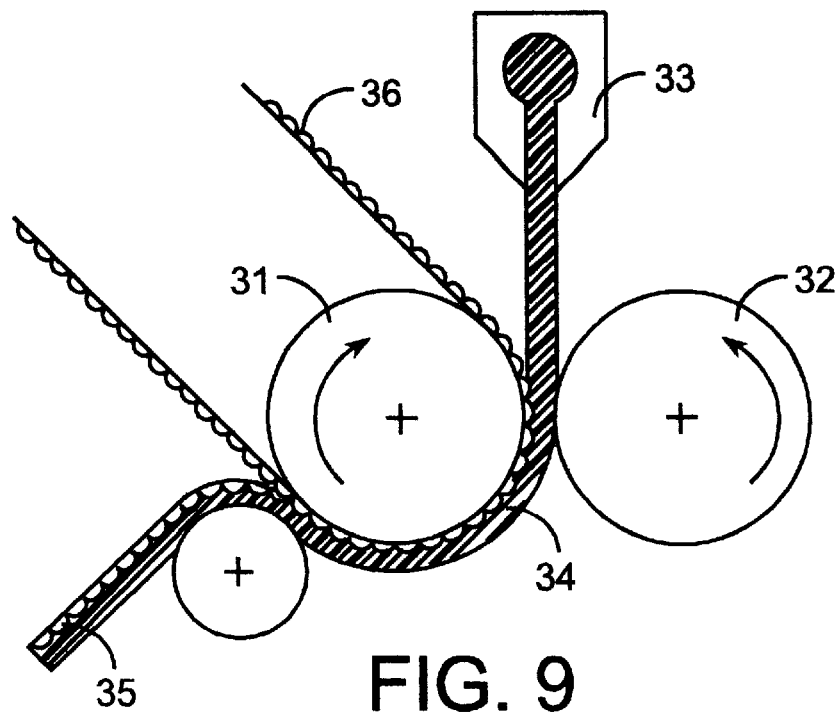
FIG. 9 is a schematic view of a mechanical arrangement to be used in a process of forming minute diffusing elements on the surfaces of the lenticular elements of a base lenticular lens sheet simultaneously with the formation of the base lenticular lens sheet with an embossing plastic film having a surface of a shape complementary to the minute diffusing elements to be formed on the surfaces of the lenticular elements.

FIG. 9 shows a mechanical arrangement for carrying out a lenticular lens sheet fabricating method in accordance with the present invention for forming a lenticular lens sheet 35 having lenticular elements provided in their surfaces with minute grooves by using the foregoing embossing plastic film provided with the minute ridges. Referring to FIG. 9, a second roller 31 is provided in its circumference with a plurality of circumferential grooves complementary to lenticular elements to be embossed in a back surface of a base lenticular lens sheet 34 and arranged at an axial pitch in the range of about 0.1 to about 0.2 mm. A pressure roller 32 serving also as a cooling roller is pressed against the second roller 31. The embossing plastic film 36 is extended so as to wind around the second roller 31. A molten acrylic resin is extruded continuously through a T-die 33 so that a base lenticular lens sheet 34 is fed between the second roller 31 and the pressure roller 32 so as to wrap around the second roller 31. The pressure roller 32 may be provided in its circumference with an engraving complementary to lenticular elements different from those to be embossed in the rear surface of the base lenticular lens sheet 34 to emboss the lenticular elements in the front surface of the base lenticular lens sheet 34. The second roller 31 embosses the lenticular elements in the rear surface of the base lenticular lens sheet 34, and the embossing plastic film 36 is bonded temporarily to the base lenticular lens sheet 34. The embossing plastic film 36 temporarily bonded to the base lenticular lens sheet 34 is separated from the base lenticular lens sheet 34 when the base lenticular lens sheet 34 is transferred from the second roller 31 to a cooling roller. Usually, the adhesive strength of adhesive bond between a set UV setting resin and a thermoplastic resin is relatively low, the base lenticular lens sheet 34 can easily be separated from the embossing plastic film 36.

The lenticular lens sheets may be provided in its rear surface with V-lenticular elements, i.e., linear lenticular elements of a V-shaped cross section, polygonal lenticular elements, i.e., linear lenticular elements of a polygonal cross section or the like instead of the linear lenticular elements having a semicircular cross section.

An embossing plastic film of a thickness excessively great as compared with the pitches of the grooves formed in the circumference of the second roller 31 for forming the lenticular elements in the surface of the base lenticular lens sheet 34 is unable to conform satisfactorily to the shape of the circumference of the second roller 31. Therefore, the plastic film must have an appropriate thickness, must be capable of being stretched to some extent when heated.

Examples of the foregoing embodiment will be described hereinafter.

Fabrication of Embossing Plastic Film

The first roller 21 of FIG. 7 was provided in its circumference with parallel axial grooves 22 of a semicircular cross section of 20 $\mu$m in height arranged at a circumferential pitch of 20 $\mu$m. A 25 $\mu$m thick PET film 27 was supplied so as to be wound around the first roller 21, and an UV setting resin 28 (UV setting urethane acrylate resin XD-808 available from Dainichi Seika Kogyo K.K.) was fed onto the circumference of the first embossed roller 21 so as to be held between the circumference of the first roller 21 and the PET film 27. The UV radiating device 26 irradiated the UV resin 28 through the PET film 27 with UV rays at an intensity of 160 W/cm to set the UV setting resin 28 coating the circumference of the first roller 21. The PET film 27 was separated from the first roller 21. An embossing plastic film provided with transverse, linear minute ridges of a semicircular cross section of 20 $\mu$m in height was obtained.

Formation of Lenticular Lens Sheet

A lenticular lens sheet 35 was formed by the mechanical arrangement shown in FIG. 9. A molten acrylic resin was extruded through the T-die 33 onto the second roller 31 provided in its circumference with circumferential grooves of an elliptic cross section of 500 μm in depth arranged at an axial pitch of 800 μm so that a 0.9 mm thick base lenticular lens sheet 34 was fed at a feed speed of 2.5 m/min between the second roller 31 and the pressure roller 32, while the embossing plastic film was extended so as to wind around the second roller 31 with the surface thereof provided with the minute ridges in contact with the base lenticular lens sheet 34.

Figure 10A:
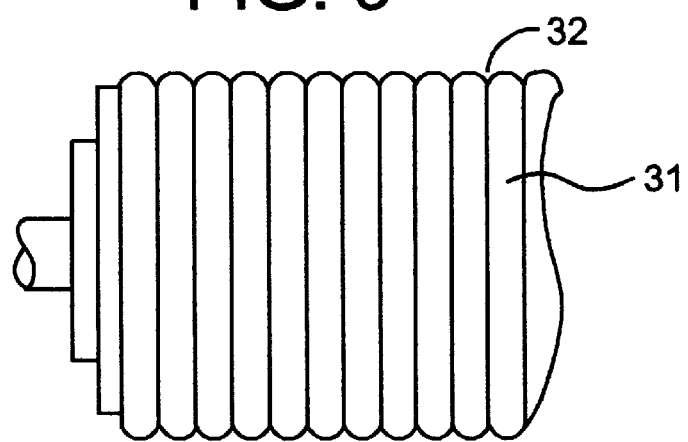
FIG. 10(A) is a fragmentary front view of a second embossed roller for forming a base lenticular lens sheet having a surface provided with concave lenticular elements.
Figure 10B:
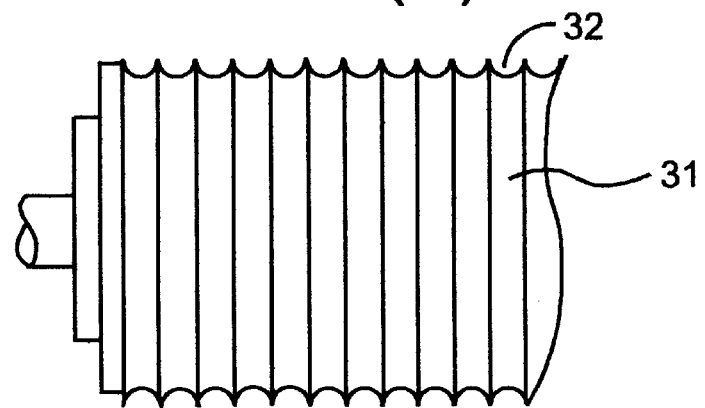
FIG. 10(B) is a fragmentary front view of a first embossed roller for forming a base lenticular lens sheet having a surface provided with convex lenticular elements.

A second roller 31 provided with circumferential ridges as shown in FIG. 10(A) is employed in forming a base lenticular lens sheet provided in its surface with longitudinal concave lenticular element. A second roller 31 provided with circumferential grooves as shown in FIG. 10(B) is employed in forming a base lenticular lens sheet provided in its surface with longitudinal convex lenticular elements.

Separation of Embossing Plastic Film.

Figure 11A:
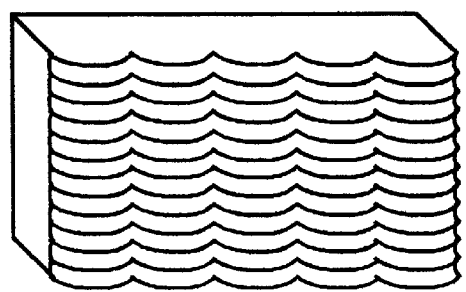
FIGS. 11(A) and 11(B) are respectively a lenticular lens sheet and a graph showing a luminance distribution on the light exit surface of a lenticular lens sheet having lenticular elements provided in their surface with ridges and furrows perpendicular to the lenticular elements when light rays fall on the light entrance surface of the lenticular lens sheet.
Figure 11B:
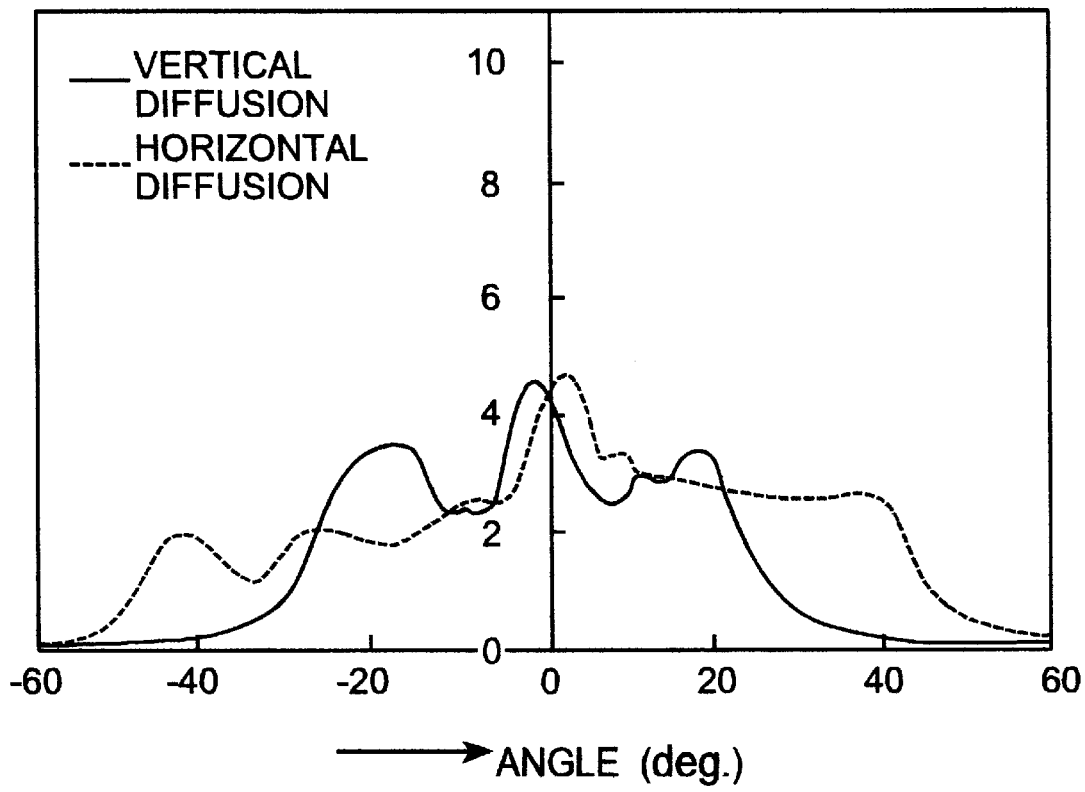

The embossing plastic film 36 was separated from the base lenticular lens sheet 34 as the base lenticular lens sheet 34 is transferred from the second roller 31 to the cooling roller. Thus, a lenticular lens sheet 35 having lenticular elements provided in their surfaces with transverse minute ridges and furrows perpendicular to the lenticular elements as shown in FIG. 6(B) was obtained. FIG. 11(B) is a graph showing a luminance distribution on the light exit surface of the lenticular lens sheet thus fabricated when light rays fall on the light entrance surface of the lenticular lens sheet.

As mentioned above, the lenticular lens sheet in the second embodiment has lenticular elements provided in its surfaces with minute ridges and furrows perpendicular to the lenticular elements. Therefore, the lenticular lens sheet has a large diffusion angle with respect to vertical directions. Since the minute ridges and furrows can easily be formed in the surfaces of the lenticular elements, which has been impossible due to restrictions on die manufacturing techniques, by using the embossing plastic film provided with the minute ridges and furrows and the material forming the base lenticular lens sheet need not contain any diffusing agent, a satisfactory diffusing effect can be exercised without entailing reduction in the light transmittance of the lenticular lens sheet attributable to the effect of a diffusing agent.

The lenticular lens sheet may be provided in its rear surface with V-lenticular elements, i.e., linear lenticular elements of a V-shaped cross section, polygonal lenticular elements, i.e., linear lenticular elements of a polygonal cross section or the like instead of the linear lenticular elements having a semicircular cross section.

A lenticular lens sheet in a third embodiment according to the present invention will be described with reference to FIGS. 12 to 18.

FIGS. 12(A) and 12(B) show a lenticular lens sheet in a third embodiment according to the present invention having lenticular elements having the shape of a linear ridge and provided in their surfaces with minute ridges 12, i.e., minute diffusing elements, parallel to the lenticular elements. FIGS. 12(C) and 12(D) show a lenticular lens sheet in a modification of the lenticular lens sheet shown in FIGS. 12(A) and 12(B), having lenticular elements having the shape of linear ridges and provided in their surfaces with granular minute diffusing elements 12. As shown in FIGS. 12(A) to 12(B), each of the lenticular lens sheets in the third embodiment has a base lenticular lens sheet 11 and the minute diffusing elements 12 formed in the surfaces of the base lenticular elements of the lenticular lens sheet 11.

The term, "minute diffusing elements" used herein does not signify any particular size in a fixed range, but signifies diffusing elements of sizes in the range of 1 to 200 μm far smaller than the pitches of the lenticular elements of the base lenticular lens sheet 11.

The minute diffusing elements 12 may be formed by pressing an embossing plastic film provided on its surface with minute diffusing elements of an ionizing radiation setting resin against the base lenticular lens sheet 11 while the resin forming the base lenticular lens sheet 11 is hot and plastic, and then separating the embossing plastic film from the base lenticular lens sheet 11 after the resin forming the base lenticular lens sheet has been cooled.

The ionizing radiation setting resin forming the minute diffusing elements of the embossing plastic film may be an epoxy resin, a polyester resin, an acrylic resin, a urethane acrylate resin or the like. The plastic film of the embossing plastic film for embossing the minute diffusing elements in the surfaces of the lenticular elements of the base lenticular lens sheet 11 may be any suitable plastic film provided that the plastic film has a high transmittance with ionizing radiation, such as electron beams or UV rays, and is easily separable from the base lenticular lens sheet 11. Suitable films as the plastic film are, for example, those of a PET resin, a polyamide resin, a polyolefin resin and the like. These films may be coated with a releasing agent to facilitate the separation of the embossing plastic film from the base lenticular lens sheet 11.

The base lenticular lens sheet 11 may be formed of a thermoplastic resin having a high light transmittance, such as an acrylic resin, containing a diffusing agent dispersed therein.

Figure 13:
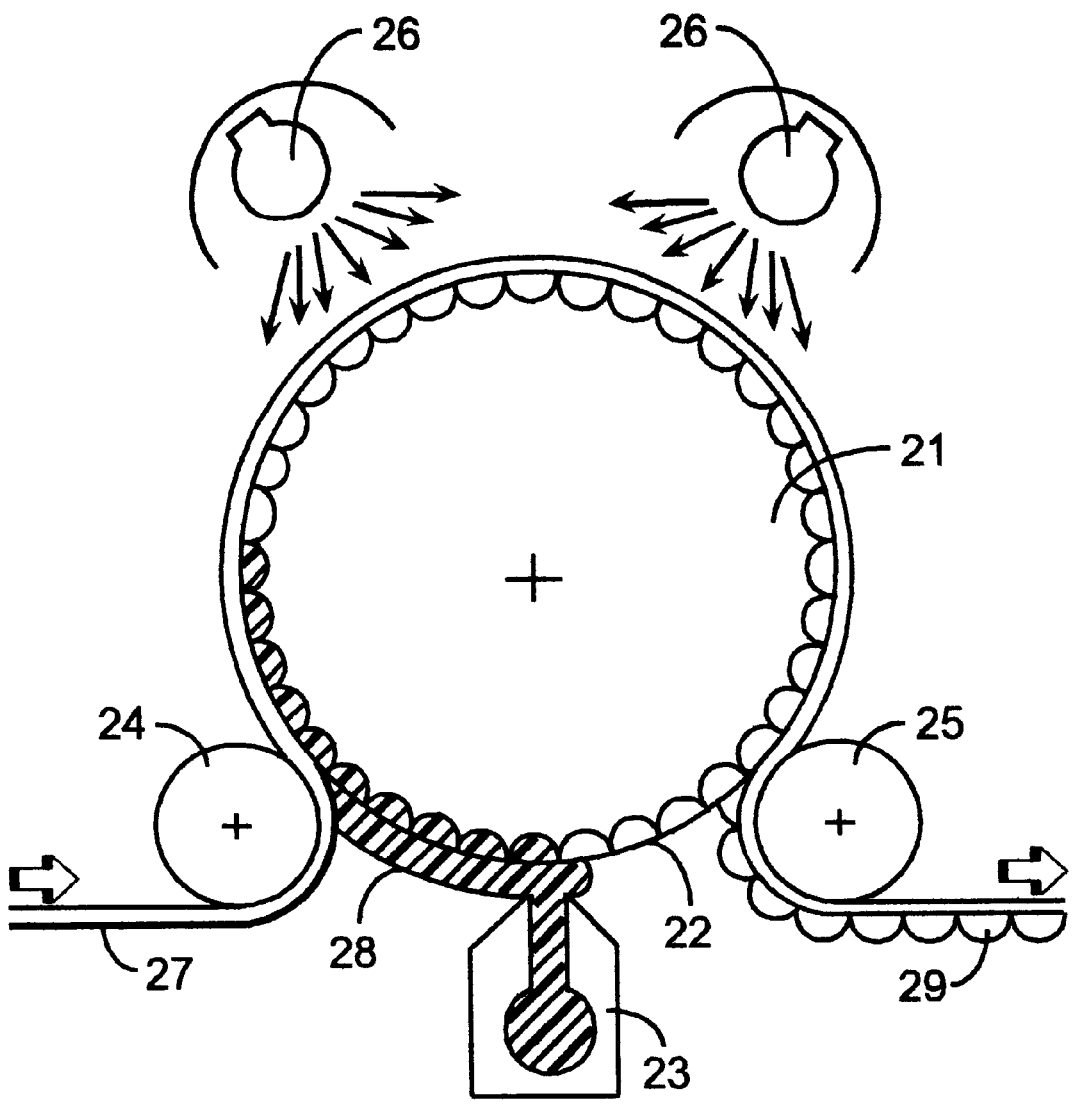
FIG. 13 is a schematic view of a mechanical arrangement to be used in a process of forming minute diffusing elements in the surface of a plastic film by a method in accordance with the present invention.

Shown in FIG. 13 is a mechanical arrangement for forming the embossing plastic film employed in a method of fabricating the lenticular lens sheet in the third embodiment. Referring to FIG. 13, a first roller 21 is provided in its circumference with axial minute grooves 22 of a shape corresponding to minute grooves to be embossed in the surfaces of the lenticular elements. The embossing plastic film formed by using the first roller 21 has minute ridges extending across the width thereof. If it is desired to form minute ridges 12 in the surfaces of the lenticular elements of the base lenticular lens sheet 11 as shown in FIG. 12(A), a first roller 21 provided in its circumference with axial minute ridges corresponding to the minute ridges 12 is used for forming an embossing plastic film provided with minute grooves complementary to the minute ridges 12.

A plastic film 27 is supplied so as to wind around the first roller 21. An extrusion nozzle 23 generally employed in a coating apparatus and a coater is disposed below the first roller 21 to feed a liquid UV setting resin 28, i.e., a liquid ionizing radiation setting resin, onto the circumference of the first roller 21. When set, the UV setting resin 28 is hardly subject to deformation by heat or pressure. The UV setting resin 28 may be spread over either the circumference of the first roller 21 or the surface of the plastic film 27. It is important to spread the liquid UV setting resin 28 so that portions of the liquid UV setting resin 28 filling up the axial minute grooves 22 do not contain any bubbles. Pressure rollers 24 and 25 are disposed in contact with the circumference of the first roller 21 to wrap the plastic film 27 around the circumference of the first roller 21. UV radiating devices 26 are disposed diametrically opposite to the extrusion nozzle 23.

The plastic film 27 supplied from below the first roller 21 is pressed against the circumference of the first roller 21 by the pressure roller 24 so that the plastic film 27 comes into contact with the UV setting resin 28 filling up the minute grooves 22, whereby the surface of the film 27 is wetted by the liquid UV setting resin 28. The UV radiating devices 26 irradiate the UV setting resin 28 through the plastic film 27 as the plastic film 27 moves past the UV radiating devices 26. Consequently, the UV setting resin 28 adhering to the plastic film 27 is set to form minute ridges 29 fixedly attached to the surface of the plastic film 27. The plastic film 27 provided with the minute ridges 29 is separated from the first roller 21 after the same has passed the pressure roller 25, and is taken up in a roll. The grooves can be formed in the circumference of the first roller 21 by a well-known etching process, a grinding process or an electrochemcial molding process.

Figure 14:
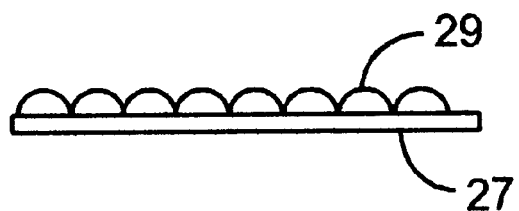
FIG. 14 is a sectional view of an embossing plastic film having a surface provided with minute diffusing elements to be employed by a method of fabricating a lenticular lens sheet in accordance with the present invention.
Figure 15A:
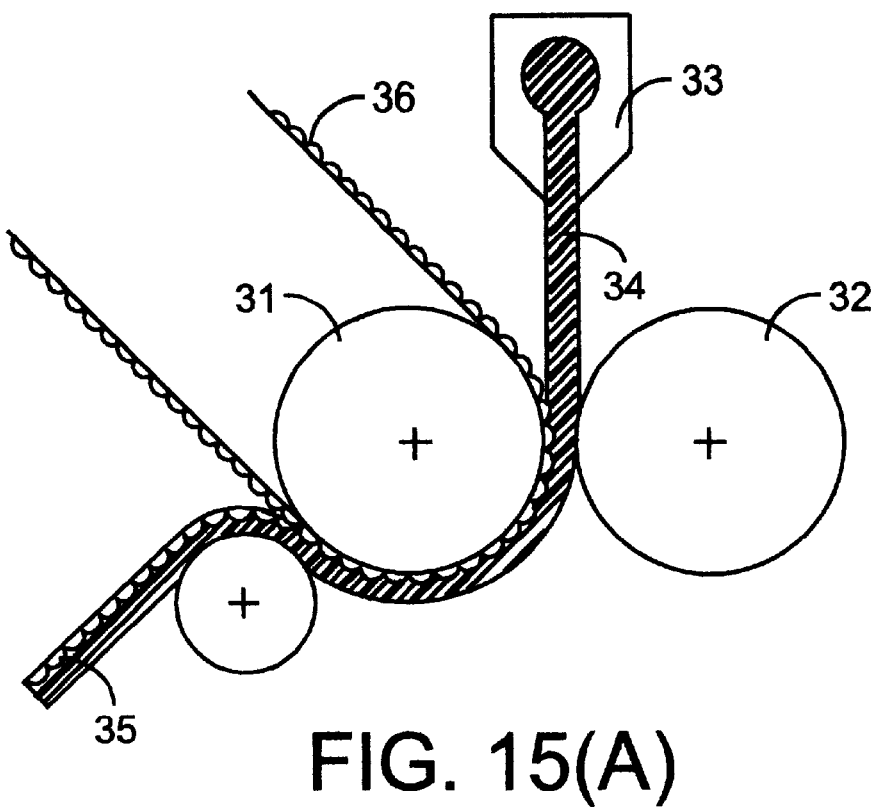
FIG. 15(A) is a schematic view of a mechanical arrangement to be used in a process of forming a base lenticular lens sheet and forming minute diffusing elements in one surface of the base lenticular lens sheet with a plastic film having a surface provided with minute diffusing elements.

A description will be given of a process of embossing minute grooves in the surfaces of lenticular elements formed on a surface of a base lenticular lens sheet 34 by using the embossing plastic film thus provided with the minute ridges 29 as shown in FIG. 14. FIG. 15(A) shows a mechanical arrangement for carrying out a lenticular lens sheet fabricating method in accordance with the present invention for forming minute grooves in one surface of a base lenticular lens sheet 34, and FIG. 15(B) shows a mechanical arrangement for carrying out a lenticular lens sheet fabricating method in accordance with the present invention for forming minute grooves in opposite surfaces of a base lenticular lens sheet 34.

Referring to FIG. 15(A), a second roller 31 is provided in its circumference with a plurality of circumferential grooves complementary to lenticular elements to be embossed in a back surface of a base lenticular lens sheet 34 and arranged at an axial pitch in the range of about 0.1 to about 0.2 mm. A pressure roller 32 serving also as a cooling roller is pressed against the second roller 31. The embossing plastic film 36 provided with the minute ridges 29 is extended so as to wind around the second roller 31. A molten acrylic resin is extruded continuously through a T-die 33 so that a base lenticular lens sheet 34 is fed between the second roller 31 and the pressure roller 32 so as to wrap around the second roller 31. The pressure roller 32 may be provided in its circumference with an engraving complementary to lenticular elements different from those to be embossed in the rear surface of the base lenticular lens sheet 34 to emboss the lenticular elements in the front surface of the base lenticular lens sheet 34. The second roller 31 embosses the lenticular elements in the rear surface of the base lenticular lens sheet 34, and the embossing plastic film 36 is bonded temporarily to the base lenticular lens sheet 34. The embossing plastic film 36 temporarily bonded to the base lenticular lens sheet 34 is separated from the base lenticular lens sheet 34 when the base lenticular lens sheet 34 is separated from the second roller 31. Usually, the adhesive strength of adhesive bond between a set UV setting resin and a thermoplastic resin is relatively low, the base lenticular lens sheet 34 can easily be separated from the embossing plastic film 36.

Figure 15B:
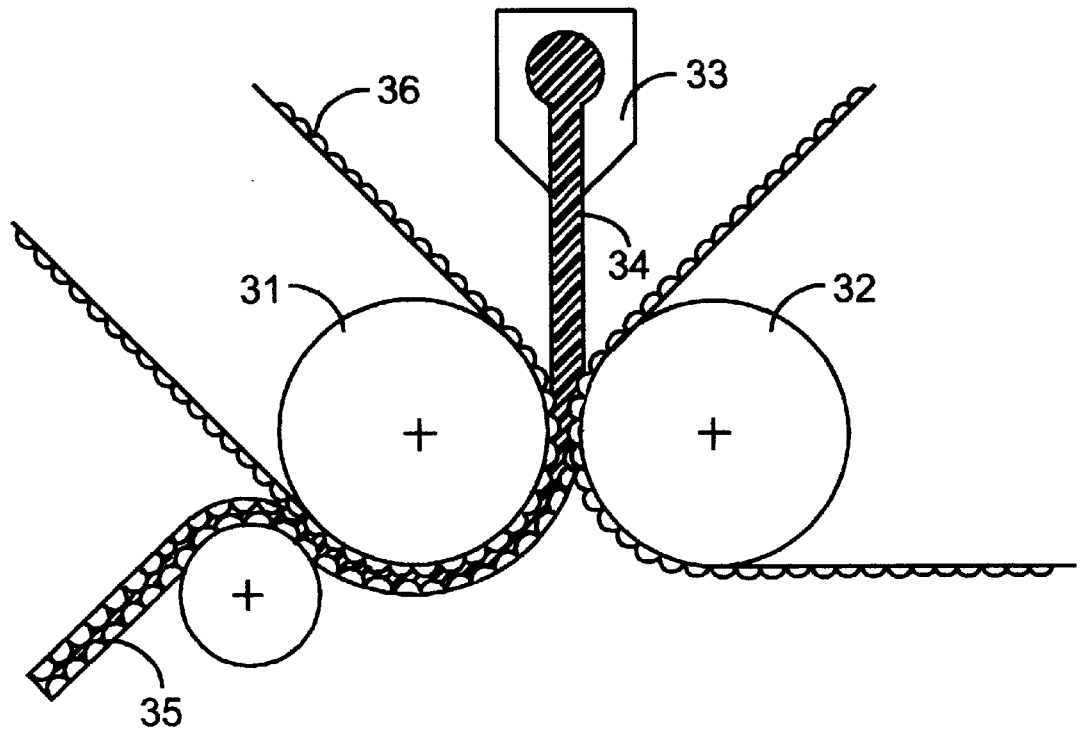
FIG. 15(B) is a schematic view of a mechanical arrangement to be used in another process of forming a base lenticular lens sheet and forming minute diffusing elements in opposite surfaces of the base lenticular lens sheet with plastic films each having a surface provided with minute diffusing elements.
Figure 16:
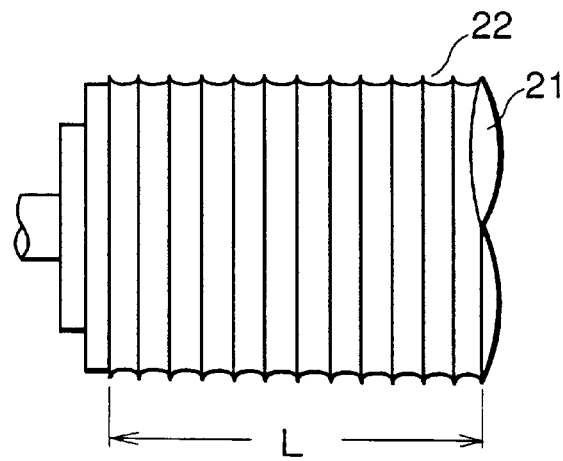
FIG. 16(A) is a fragmentary front view of a first roller having a circumference provided with circumferential grooves for forming longitudinal, parallel, minute ridges on a surface of a plastic film to obtain an embossing plastic film for forming minute grooves in the surfaces of lenticular elements of a base lenticular lens sheet in parallel to the lenticular elements.
FIG. 16(B) is an enlarged, fragmentary view of a second roller having a circumference provided with circumferential grooves for embossing longitudinal ridges in a surface of a base lenticular lens sheet.
Figure 16:
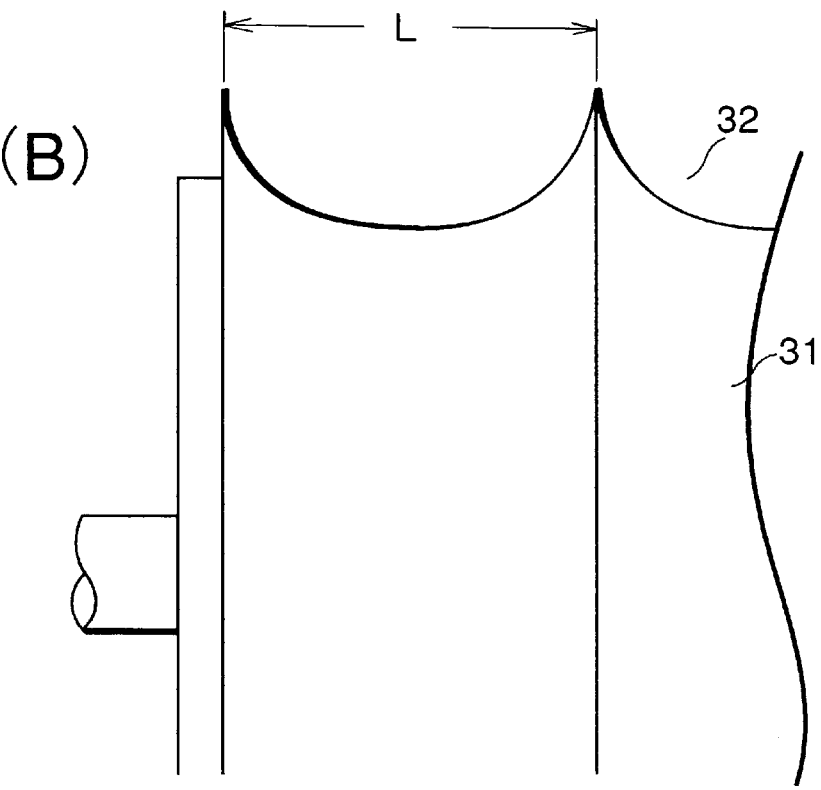

In the mechanical arrangement shown in FIG. 15(B), two embossing plastic films 36 provided with minute ridges 29 are extended so as to wind around a second roller 31 and a pressure roller 32, respectively, to form minute grooves in the opposite surfaces of a base lenticular lens sheet 34.

As is obvious from FIGS. 16(A) and 16(B), twelve minute grooves of length L formed in the circumference of a first roller 21 shown in FIG. 16(A) correspond to one circumferential groove of length L formed in the circumference of a second roller 31 shown in FIG. 16(B). However, the twelve minute grooves of the first roller 21 do not necessarily correspond to one groove of the second roller 31 because the width of each of the grooves of the second roller 31 is not equal to length of an intersection line between the surface of each of the grooves of the second roller 31 and a plane including the axis of the second roller 31. Therefore, the pitches of the grooves of the first roller 31 must be determined through experiments by a trial-and-error method to form a desired number of minute grooves accurately in the surface of each of the lenticular elements.

An embossing plastic film of a thickness excessively great as compared with the pitches of the grooves of the second roller 31 is unable to conform satisfactorily to the shape of the circumference of the second roller 31. Therefore, the plastic film must have an appropriate thickness, must be capable of being stretched to some extent when heated.

Examples of the third embodiment will concretely be described hereinafter.

Fabrication of Embossing Plastic Film

The first roller 21 of FIG. 13 was provided in its circumference with parallel axial grooves 22 of a semicircular cross section of 20 $\mu$m in height arranged at a circumferential pitch of 20 $\mu$m. A 25 $\mu$m thick PET film 27 was supplied so as to be wound around the first roller 21, and an UV setting resin 28 (UV setting urethane acrylate resin XD-808 available from Dainichi Seika Kogyo K.K.) was fed onto the circumference of the first embossed roller 21 so as to be held between the circumference of the first roller 21 and the PET film 27. The UV radiating devices 26 irradiated the UV resin 28 through the PET film 27 with UV rays at an intensity of 160 W/cm to set the UV setting resin 28 coating the circumference of the first roller 21. The PET film 27 was separated from the first roller 21. An embossing plastic film provided with transverse, linear minute ridges of a semicircular cross section of 20 $\mu$m in height was obtained.

Formation of Lenticular Lens Sheet

A lenticular lens sheet 35 was formed by the mechanical arrangement shown in FIG. 15(A). A molten acrylic resin was extruded through the T-die 33 onto the second roller 31 provided in its circumference with circumferential grooves of an elliptic cross section of 500 $\mu$m in depth arranged at an axial pitch of 800 $\mu$m so that a 0.9 mm thick base lenticular lens sheet 34 was fed at a feed speed of 2.5 m/min between the second roller 31 and the pressure roller 32, while the embossing plastic film was extended so as to wind around the second roller 31 with the surface thereof provided with the minute ridges in contact with the base lenticular lens sheet 34.

Separation of Embossing Plastic Film.

Figure 17:
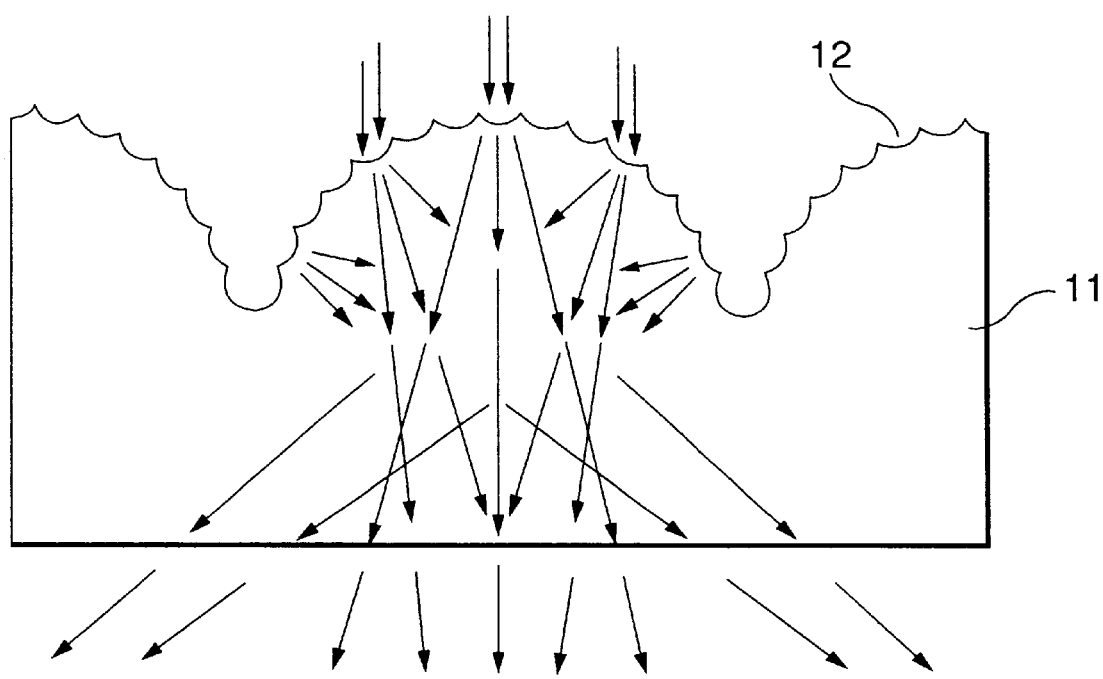
FIG. 17 is a fragmentary schematic view of a base lenticular lens sheet having lenticular elements each provided in its surface with minute grooves parallel to the lenticular element of the base lenticular lens sheet, in which the arrows indicate paths of light fallen on the lenticular elements.

The embossing plastic film 36 was separated from the base lenticular lens sheet 34 as the base lenticular lens sheet 34 is transferred from the second roller 31 to the cooling roller. Thus, a lenticular lens sheet 35 having lenticular elements provided in their surfaces with transverse minute ridges and furrows perpendicular to the lenticular elements as shown in FIG. 12(A) was obtained. The lenticular lens sheet thus fabricated has lenticular elements provided in its surfaces with the minute ridges and furrows perpendicular to the lenticular elements and is capable of diffusing light fallen on its light entrance surface in all directions as shown in FIG. 17.

Figure 18A:
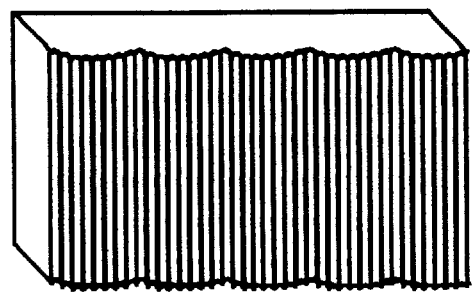
FIGS. 18(A) and 18(B) are respectively a lenticular lens sheet and a graph showing a luminance distribution on the light exit surface of a lenticular lens sheet when light rays fall on the light entrance surface of the lenticular lens sheet.
Figure 18B:
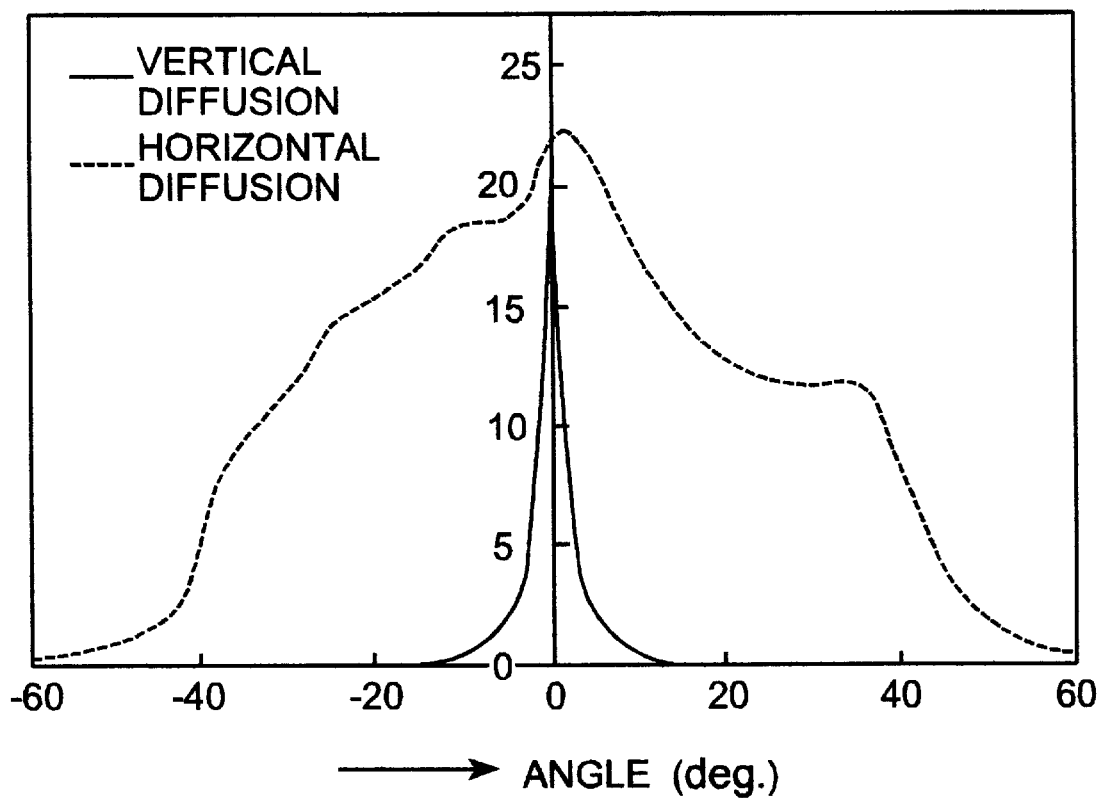

FIGS. 18(A) and 18(B) are a respectively a lenticular lens sheet and a graph showing a luminance distribution on the light exit surface of the lenticular lens sheet thus fabricated having the lenticular elements provided in their surfaces with the ridges and furrows perpendicular to the lenticular elements when light rays fall on the light entrance surface of the lenticular lens sheet. As is known from FIG. 18(B), the luminance distribution is relatively irregular because the pitches of the diffusing elements, i.e., the minute ridges and furrows, are relatively great, and do not necessarily indicate ideal lenticular lens characteristics. A lenticular lens sheet capable of exercising diffusion characteristics comparable to those of a diffusing agent can be obtained by providing the lenticular elements with minute diffusing elements of an improved shape arranged at a reduced pitch.

As is apparent from the foregoing description, since the lenticular lens sheet of the present invention provided with the minute diffusing elements in the surfaces of the lenticular elements of the base lenticular lens sheet, light is scattered in all directions from the lenticular elements, so that the side gain is improved. Since the minute diffusing elements can easily be formed in the surfaces of the lenticular elements of the lenticular lens sheet of the present invention, which has been impossible due to restrictions on die manufacturing techniques, by embossing the minute diffusing elements in the surfaces of the lenticular elements of the base lenticular lens sheet with the embossing plastic film provided with the minute diffusing elements, and the material forming the base lenticular lens sheet need not contain any diffusing agent, a satisfactory diffusing effect can be exercised without entailing reduction in the light transmittance of the lenticular lens sheet attributable to the effect of a diffusing agent.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A lenticular lens sheet for use as a rear projection screen, said lens sheet comprising:
   a base lenticular lens sheet having a plurality of lenticular elements arranged parallel to each other on a surface of the base lenticular lens sheet; and
   a surface diffusing part having minute diffusing elements minuter than the lenticular elements, and formed in minute lenticular lens shape on the surfaces of the lenticular elements of the base lenticular lens sheet and arranged in a repeating pattern of the minute lenticular lens shape in a direction perpendicular or parallel to a direction in which the lenticular elements are arranged.

2. The lenticular lens sheet according to claim 1, wherein the surface diffusing part is formed on a light entrance surface or a light exit surface of the base lenticular lens sheet.

3. The lenticular lens sheet according to claim 1, wherein the surface diffusing part is formed on both a light entrance surface and a light exit surface of the base lenticular lens sheet.

4. The lenticular lens sheet according to claim 1, further comprising a plastic film on which the minute diffusing elements of the surface diffusing part are located, the plastic film being adjacent a surface of the base lenticular lens sheet with the minute diffusing elements facing outside.

5. The lenticular lens sheet according to claim 1, wherein the minute diffusing elements of the surface diffusing part are formed of an ionizing radiation setting resin.

6. The lenticular lens sheet according to claim 1, wherein the diffusing elements of the surface diffusing part are embossment in a surface of the base lenticular lens sheet.

7. The lenticular lens sheet according to claim 1, wherein the minute diffusing elements have a convex shape of a cross section corresponding to part of an ellipse or a circle.

8. The lenticular lens sheet according to claim 1, wherein the minute diffusing elements have a concave shape of a cross section corresponding to part of an ellipse or a circle.

9. The lenticular lens sheet according to claim 1, wherein the plurality of lenticular elements are arranged at equal pitches, the minute diffusing elements are arranged in a repeating pattern of an elemental shape in a direction perpendicular to a direction in which the lenticular elements are arranged.

10. The lenticular lens sheet according to claim 1, wherein the plurality of lenticular elements are arranged at equal pitches, the minute diffusing elements and are arranged in a repeating pattern of an elemental shape in a direction parallel to a direction in which the lenticular elements are arranged.

* * * * *